United States Patent
Berlioz et al.

[19]

[11] Patent Number: 6,111,525
[45] Date of Patent: Aug. 29, 2000

[54] INDICATOR FOR MONITORING THE PATH OF AN AIRCRAFT IN A HORIZONTAL PLANE

[75] Inventors: Raymond Jacques Gérard Berlioz, Salon de Provence; Vincent Frédéric Saintagne, Velaux, both of France

[73] Assignee: Eurocopter, Marignane Cedex, France

[21] Appl. No.: 09/244,957

[22] Filed: Feb. 10, 1999

[30] Foreign Application Priority Data

Feb. 11, 1998 [FR] France ............................ 98 01620

[51] Int. Cl.$^7$ ............................................ G01C 21/00
[52] U.S. Cl. ........................ 340/971; 340/973; 340/975; 340/979
[58] Field of Search ........................ 340/971, 973, 340/974, 975, 979, 961; 244/181; 701/14, 4

[56] References Cited

U.S. PATENT DOCUMENTS

| | | | |
|---|---|---|---|
| 3,355,733 | 11/1967 | Mitchell et al. | 340/975 |
| 3,696,426 | 10/1972 | Perkins | 340/979 |
| 4,326,189 | 4/1982 | Crane | 340/973 |
| 5,136,301 | 8/1992 | Bechtold et al. | 340/977 |
| 5,359,890 | 11/1994 | Fulton et al. | 340/973 |
| 5,412,382 | 5/1995 | Leard et al. | 340/973 |

FOREIGN PATENT DOCUMENTS

| | | |
|---|---|---|
| 0411309 | 2/1991 | European Pat. Off. . |
| 1514442 | 2/1968 | France . |

OTHER PUBLICATIONS

French Search Report dated Nov. 6, 1998.
Patent Abstract of Japan, vol. 95, No. 7, Aug. 31, 1995, JP 07091975A (Toyota Motor Corp), Apr. 7, 1995.

*Primary Examiner*—Daniel J. Wu
*Assistant Examiner*—John Tweel, Jr.
*Attorney, Agent, or Firm*—Stevens, Davis, Miller & Mosher, L.L.P.

[57] ABSTRACT

The present invention relates to an indicator for monitoring the path of an aircraft in a horizontal plane, comprising:
sensors delivering information relating to said aircraft,
means for processing the information delivered by said sensors,
means for displaying the signals delivered by said processing means presenting on a display screen:
   a symbol (11) portraying the position of the aircraft, the extensions of which designate the longitudinal (X—X) and transverse (Y—Y) axes of the aircraft,
   a compass rose (10) which can move in rotation about said symbol.
According to the invention, said compass rose (10) presents a deformation along at least one of said longitudinal (X—X) and transverse (Y—Y) axes.

5 Claims, 2 Drawing Sheets

INDICATOR FOR MONITORING THE PATH OF AN AIRCRAFT IN A HORIZONTAL PLANE

The present invention relates to an indicator for monitoring the path of an aircraft in a horizontal plane.

More particularly, it allows the presentation to the pilot(s) of innovative symbology for monitoring the path of the aircraft in a horizontal plane, which, through its design, eases the comprehension thereof and the integration thereof with the other flight control information delivered to the pilot(s).

Within the framework of the activity of piloting aircraft, the crew members have at their disposal, on the instrument panel, in addition to the primary flight instrumentation (speed, altitude, trim, etc.), a certain number of indicators enabling them to monitor the path of the aircraft in a horizontal plane.

These indicators, regardless of the technology employed to construct them (electromechanical instruments or display screen), usually consist of a circular compass rose presenting the magnetic or geographical heading of the aircraft and to which rose are referred, as a function of the relevant phase of flight, various types of monitoring information.

During the instrument-based phases of flight, information regarding deviation with respect to the scheduled theoretical path (flight plan, or radial selected with respect to a means of radionavigation for example) are used by the pilot as an aid to navigation; the indicator then receives the name of horizontal situation indicator.

In the case of helicopters, during the phases of hovering flight (or those close to hovering flight), information regarding horizontal ground speeds and longitudinal ground speed respectively, along the axis of the machine and lateral ground speed perpendicular to the axis of the machine (VX and VY), are used to ease the acquisition and holding of hovering flight at a given heading; the indicator then receives the name of hovering flight indicator.

In all cases, this information is therefore represented conventionally on one or more circular dials representative of the abovementioned compass rose.

Moreover, in the case when these indicators are employed via EFIS (Electronic Flight Instrument System) display systems, these various uses may correspond to various modes of operation of the screen dedicated to the navigation function.

Furthermore, with the advent of display screens of large dimensions, solutions which juxtapose these display modes dedicated to the navigation function under the primary flight instruments within one and the same screen have made an appearance so as to optimize the space used by the instrument panel and to decrease the effort of "scanning" between the instruments, while however raising the problem of the segregation of the information as a function of its type (vertical or horizontal plane).

The purpose of the present invention is to provide, on a display screen, the pilot(s) with an indication for monitoring the path of the aircraft in the horizontal plane, which indication is more understandable and better integrated with the remainder of the instrumentation (in particular the primary flight instrumentation related mainly to the vertical plane) than the standard indicators.

To that end, an indicator for monitoring the path of an aircraft in a horizontal plane, comprising:

sensors delivering position references and path monitoring information relating to said aircraft, means for processing the information delivered by said sensors, means for displaying the signals delivered by said processing means presenting on a display screen:
  a symbol portraying the position of the aircraft, the extensions of which designate the longitudinal (X—X) and transverse (Y—Y) axes of the aircraft,
  a compass rose which can move in rotation about said symbol, is noteworthy, according to the invention, in that said compass rose presents a deformation along at least one of said longitudinal X—X and transverse Y—Y axes.

Preferably, said compass rose presents a deformation along said longitudinal axis X—X, imparting to this deformation a shape of an ellipse whose major axis is formed by said transverse axis Y—Y, the deformation factor along said longitudinal axis X—X possibly being, advantageously, substantially equal to 0.5.

Thus, there is obtained:

an effect of horizontal perspective which makes apparent the role of path monitoring in the horizontal plane of the indicator, a significant reduction in the bulkiness of the indicator, an increase in the accuracy of reading the heading of the aircraft;

these advantages being developed and specified hereafter.

Additionally, said means of processing the information delivered by said sensors comprise:

a system of references delivering the heading of the aircraft, a system for monitoring the path in the horizontal plane delivering the current position and the horizontal ground speeds of the aircraft, as well as the latter's scheduled path, a computer catering for the transformation of the physical data delivered by said systems into data adapted for display on a screen, and a generator of symbols.

Moreover, said compass rose is able to move in rotation about said fixed symbol representative of the aircraft, the graduations of the compass rose travelling past a fixed index situated on the longitudinal axis X—X of the aircraft and portraying a radius of the compass rose; the information for monitoring the path in the horizontal plane being presented inside the surface defined by said compass rose.

The figures of the appended drawing will elucidate the manner in which the invention may be practised. In these figures, identical references designate similar elements.

Figure 1:
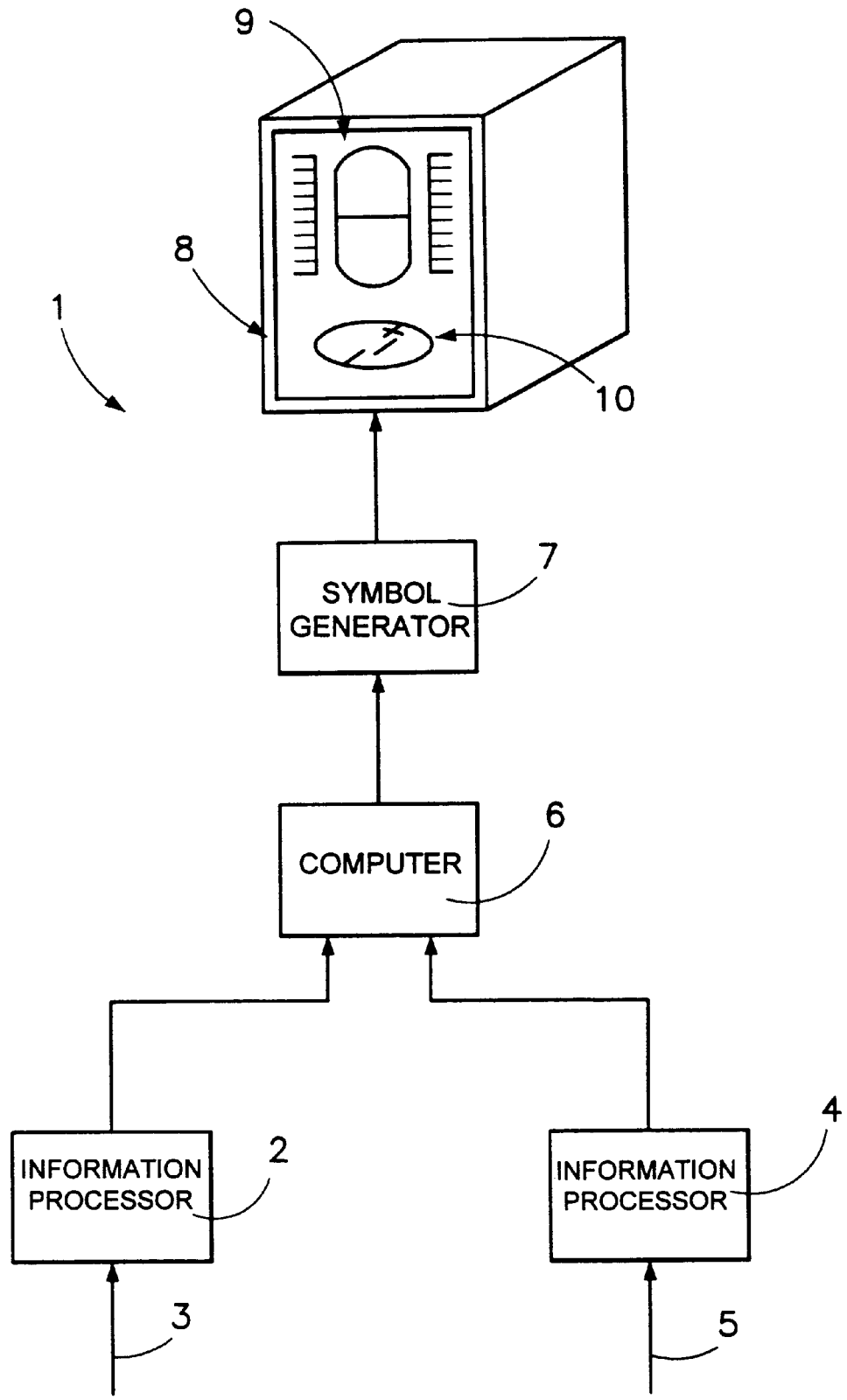
FIG. 1 is a diagrammatic representation of an illustrative embodiment of the indicator according to the invention, presenting both an example of avionic architecture in relation to the invention and also an example of a layout, on an aircraft instrument panel display screen, of the dial or compass rose according to the present invention.

With regard to FIG. 1, the indicator 1 for monitoring the path of an aircraft in a horizontal plane comprises:

a system of primary references 2 delivering, on the basis of sensors 3, by terrestrial magnetic field measurement, for example, the heading of the aircraft in numerical form, a system for monitoring the path in the horizontal plane 4, delivering, by calculation on the basis of GPS or inertial positioning sensors 5 (or of radionavigation means), the current position and horizontal ground speeds of the aircraft, as well as the scheduled path of the latter (flight plan) in numerical form, a digital computer 6 catering for the transformation of the above physical data into data adapted for display on a screen, a generator of symbols 7 (or plotter) making it possible to portray on the screen, on the basis of the information delivered by the transformation computer 6, the graphical characteristics of the symbology peculiar to the invention, a screen 8 (or possibly several such screens) for displaying the image presented to the pilot(s) of the aircraft.

This provides the pilot(s) of the aircraft with a favoured flight control information base presented on the instrument panel in the form of a symbolic image, within which are included the information for monitoring the path in the horizontal plane, the presentation characteristics of which form in particular the subject of the present invention.

Figure 2:
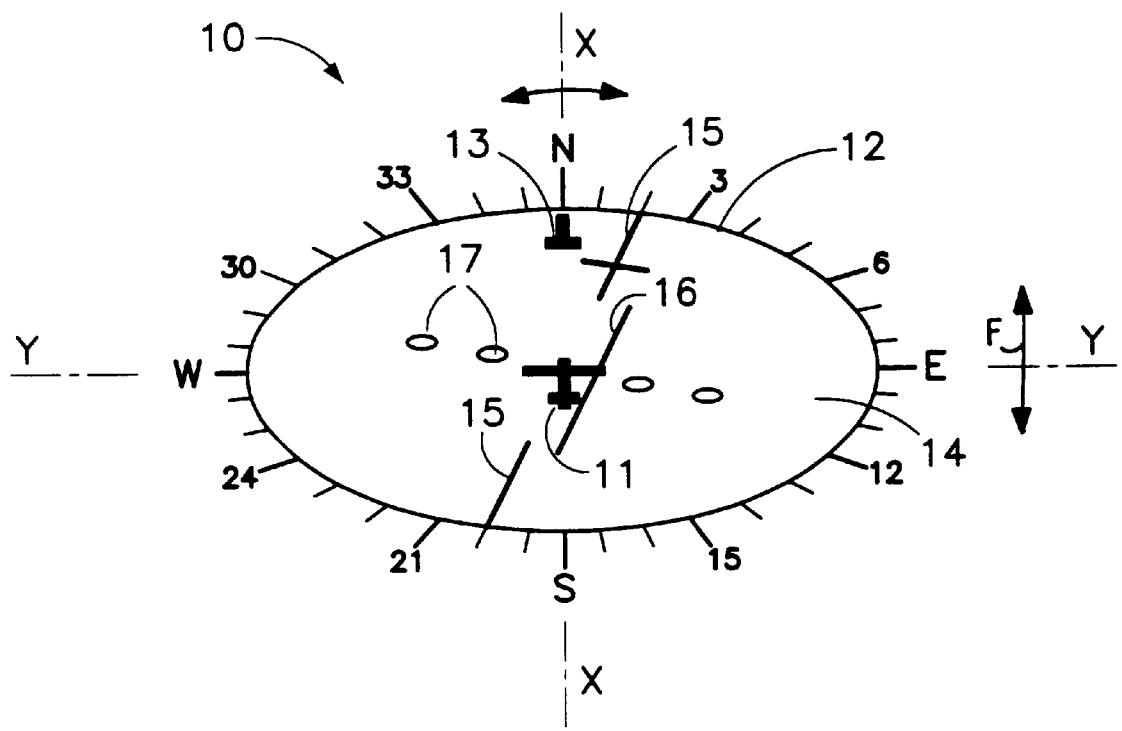
FIG. 2 is an enlarged diagrammatic representation of the elliptic compass rose according to the invention.

According to the present invention, the generator of the flight control symbols 7, receiving information originating from various sensors, in particular those relating to the measurements of the heading of the aircraft, of the horizontal ground speeds and of path monitoring, displays on the display screen 8, alongside information 9 relating to the speed, altitude and trim (artificial horizon) of the aircraft, the information for monitoring the path in the horizontal plane in the form of an elliptic compass rose 10 described in greater detail with regard to FIG. 2.

More precisely, the compass rose 10 is able to move in rotation about a fixed symbol 11, representative of the aircraft, the graduations 12 of the compass rose 10 travelling past a fixed index 13 situated on the axis X—X corresponding to the longitudinal axis of the aircraft symbolized at 11 and portraying a radius of the compass rose 10 (it will be noted that the axis Y—Y is representative of the axis orthogonal to the axis X—X, i.e. the transverse axis of the aircraft).

Additionally, the information for monitoring the path in the horizontal plane is presented inside the surface 14 defined by the compass rose 10. An example of such information is represented in FIG. 2 and described in detail below. Naturally, however, it is understood that such information depends on the type of indicator which it is desired to employ. Thus, in FIG. 2, the case of the horizontal situation indicator (cruising flight) already mentioned has been represented, but the case of the hovering flight indicator, likewise already mentioned, could also be envisaged.

As may be seen in FIG. 2, this information comprises:

a so-called "course" indication 15, that is to say a pilot selection of heading which serves as a reference (at 20° or example), an indication 16 of discrepancy between the current situation and the target situation, with reference to an angular scale represented by the circles 17. The discrepancy between two circles 17 representing, in this example, 5°, the angular discrepancy indicated is in this case 2.5° with respect to the target situation; the current situation being determined by navigation means.

As may be seen clearly in FIG. 2, the compass rose 10 has undergone a deformation along the X—X axis (arrow F), transforming the customary circular representation of the compass rose into an elliptic representation, the value of the deformation factor of which is dependent on the desired perspective effect, a deformation factor substantially equal to 0.5 providing a good compromise for this type of indicator.

It should be noted that the deformation described above (application of a constant deformation factor on the X—X axis alone) has been proposed, by way of example, since it provides the desired effect in a satisfactory manner whilst offering very simple implementation which is accessible to current conventional symbol generators.

It is clearly obvious that more complex transformations (deformation on both axes simultaneously together with management of the vanishing lines) based on 3D display techniques making it possible to achieve more striking perspective effects could be implemented if relevant.

Relative to the conventional presentation principle, the present invention therefore affords the following benefits and advantages:

an effect of horizontal perspective which makes apparent the role of path monitoring in the horizontal plane of the indicator. Furthermore, this effect makes it possible clearly to demarcate the indicators situated above which present essentially a vertical situation in the case of symbology which groups together the primary flight instruments and the indicator for monitoring the path in a horizontal plane on one and the same screen, a significant reduction (depending on the deformation factor) in the bulkiness of the indicator, in the vertical direction in the example illustrated (axis X—X), this being particularly beneficial within the framework of the design of compact symbologies which group together the primary flight instruments and the indicators for monitoring the path in a horizontal plane on one and the same screen, an increase in the accuracy of reading the heading of the aircraft related to the resolution dilatation effect induced by the deformation along the X—X axis in the central part of the compass rose.

What is claimed is:

1. An indicator for monitoring the path of an aircraft in a horizontal plane, comprising:

sensors delivering position references and path monitoring information relating to said aircraft, means for processing the information delivered by said sensors, means for displaying the signals delivered by said processing means by presenting on a display screen:

(i) a symbol portraying the position of the aircraft, the extensions of which designate the longitudinal (X—X) and transverse (Y—Y) axes of the aircraft, and (ii) a compass rose which can move in rotation about said symbol, wherein said compass rose presents a deformation along at least one of said longitudinal (X—X) and transverse (Y—Y) axes and said compass rose presents a deformation along said longitudinal axis (X—X), imparting to this deformation a shape of an ellipse whose major axis is formed by said transverse axis (YY).

2. The indicator as claimed in claim 1, wherein the deformation factor along said longitudinal axis (X—X) is substantially equal to 0.5.

3. The indicator as claimed in claim 7, wherein said means for processing the information delivered by said sensors comprise:

a system of references delivering the heading of the aircraft, a system for monitoring the path in the horizontal plane and delivering the current position, the horizontal ground speeds, and the scheduled path of the aircraft, and a computer for transforming the physical data delivered by said systems into data adapted for display on a screen, and a generator of symbols.

4. The indicator as claimed in claim 1, wherein said compass rose is able to move in rotation about said fixed symbol representative of the aircraft, the graduations of the compass rose traveling past a fixed index situated on the longitudinal axis (X—X) of the aircraft and portraying a radius of the compass rose.

5. The indicator as claimed in claim 1, wherein the information for monitoring the path in the horizontal plane is presented inside the surface defined by said compass rose.

* * * * *